(12) United States Patent
Stay et al.

(10) Patent No.: US 6,878,890 B1
(45) Date of Patent: Apr. 12, 2005

(54) CIRCUIT BREAKER LOCKABLE FASTENER SECURING A MOVABLE CONTACT TO ITS TERMINAL MOUNTING

(75) Inventors: Amelia M. Stay, Rochester, PA (US); David A. Parks, Baden, PA (US); Arthur D. Carothers, Beaver Falls, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/742,594

(22) Filed: Dec. 19, 2003

(51) Int. Cl.[7] .......................... H01H 1/00; H01H 1/22; F16B 35/04
(52) U.S. Cl. ...................... 200/244; 200/237; 200/286; 403/410; 411/411; 411/548
(58) Field of Search ................ 200/237–290; 335/197; 403/410; 411/411, 548

(56) References Cited

U.S. PATENT DOCUMENTS 5,146,194 A * 9/1992 Altenhof et al. ........ 200/244 X 6,563,407 B2 * 5/2003 Kramer .................. 200/244 X \* cited by examiner

*Primary Examiner*—James R. Scott
(74) *Attorney, Agent, or Firm*—Martin J. Moran

(57) ABSTRACT

An improved lockable fastener that can be employed in a circuit breaker application includes a first member and a second member that are threadably cooperable with one another and a locking member that extends between the first and second members to resist loosening of the first and second members. The second member includes a threaded shank that is threadably received in a first threaded portion of a cavity formed in the first member. The locking member includes a threaded body and a taper, with the threaded body being threadably receivable in a second threaded portion of the first member, and with the taper being at least partially receivable in a receptacle formed in the shank of the second member. The receptacle defines a seat on the shank, and the taper engages the seat to deform at least a portion of the shank into engagement with a ledge that is interposed between the first and second threaded portions of the cavity.

20 Claims, 5 Drawing Sheets

CIRCUIT BREAKER LOCKABLE FASTENER SECURING A MOVABLE CONTACT TO ITS TERMINAL MOUNTING

BACKGROUND OF THE INVENTION

1. Field of the Invention

The present invention relates generally to circuit breakers and, more particularly, to a fastener that can be employed in a circuit breaker application, the fastener being lockable to resist release of the fastener.

2. Description of the Related Art

Circuit breakers are employed in diverse capacities in power distribution systems. An exemplary configuration of a circuit breaker would include a line conductor, a load conductor, a fixed contact, and a movable contact, with the movable contact being movable into and out of electrically conductive engagement with the fixed contact to switch the circuit breaker between the ON position and the OFF or TRIPPED positions. The fixed contact is electrically conductively engaged with one of the line and load conductors, and the movable contact is electrically conductively engaged with the other of the line and load conductors.

The movable contact is typically disposed on a movable contact arm. In some circuit breakers, the movable arm may be disposed upon a structure within the interior of the circuit breaker and a flexible shunt employed to electrically conductively connect the movable arm with its associated conductor. In other circuit breakers it may be desirable to pivotably mount the movable arm directly on the associated conductor. In such a circumstance, a fastener may be employed in making the pivotable connection between the movable arm and the conductor. The fastener must provide sufficient contact forces between the conductor and the movable arm to provide electrically conductive engagement therebetween, however the contact forces cannot be so great as to cause so much friction between the movable arm and the conductor that the pivoting action of the arm is impaired. It thus has been known to provide a threaded fastener for fastening a movable contact arm to a conductor, with the threaded fastener being tightened to a highly specific level of torque that achieves an agreeable balance between electrical conductivity and friction.

Such devices have not, however, been without limitation. It is understood that repeated opening and closing of the contacts, whereby the movable arm pivots between a closed position and an open position, can result in gradual loosening of the threaded fastener that pivotably mounts the movable arm to the conductor. Such loosening changes the torque of the fastener and thus the conductive/frictional characteristics of the pivotable connection between the movable arm and the conductor, which is undesirable.

It is also known that space is extremely limited within the confines of a circuit breaker. As such, any solution to the fastening problem must occupy a minimum of space.

It is thus desired to provide an improved fastener that is lockable and that occupies a minimum of space.

SUMMARY OF THE INVENTION

An improved lockable fastener and resulting circuit breaker meet these and other needs. An improved lockable fastener that can be employed in a circuit breaker application includes a first member and a second member that are threadably cooperable with one another, and a locking member that extends between the first and second members to resist loosening of the first and second members. The second member includes a threaded shank that is threadably received in a first threaded portion of a cavity formed in the first member. The locking member includes a threaded body and a taper, with the threaded body being threadably receivable in a second threaded portion of the first member, and with the taper being at least partially receivable in a receptacle formed in the shank of the second member. The receptacle defines a seat on the shank, and the taper engages the seat to lock the second member in fixed relation to the first member. In one embodiment of the invention, the taper deforms at least a portion of the shank into engagement with a ledge that is interposed between the first and second threaded portions of the cavity. In another embodiment, locking is achieved without a ledge.

Accordingly, an aspect of the present invention is to provide an improved lockable fastener that can be adjusted to given level of torque and then locked to resist loosening of the fastener.

Another aspect of the present invention is to provide an improved circuit breaker having a movable arm that is connected with a conductor by a lockable fastener.

Another aspect of the present invention is to provide an improved lockable fastener that occupies a minimum of space.

Another aspect of the present invention is to provide an improved lockable fastener having a locking member that is disposed substantially within the interior of the lockable fastener.

Another aspect of the present invention it to provide an improved lockable fastener having a locking member that includes a taper which is engageable with one of the members of the lockable fastener to radially and longitudinally lockably engage together the members of the lockable fastener.

Another aspect of the present invention is to provide an improved lockable fastener having a seat that is engageable by a tapered locking member.

Another aspect of the present invention is to provide an improved lockable fastener having a seat that is engageable by a tapered locking member, with the taper deforming at least a portion of the lockable fastener into engagement with a ledge of the lockable fastener.

These and other aspects of the present invention are provided by an improved lockable fastener for connecting together a plurality of components of a circuit breaker and for maintaining electrical conductivity between the components while permitting relative movement therebetween, in which the general nature of the fastener can be stated as including a first member having a threaded cavity formed therein, a second member including a threaded shank, the shank having a seat disposed thereon, at least a portion of the shank being threadably receiveable in the cavity, a locking member, the locking member being engageable with the seat to lockably engage the shank with the first member, and the first member, the second member, and the locking member being axially aligned.

Another aspect of the present invention is to provide a circuit breaker, the general nature of which can be stated as including a line conductor, a load conductor, a fixed contact, a movable contact, a movable arm, the movable contact being electrically conductively disposed on the arm, a trip unit operatively connected with the arm, and a lockable fastener, the fixed contact being electrically conductively disposed on one of the line and load conductors, the arm being electrically conductively connected with and movably mounted to the other of the line and load conductors with the lockable fastener, the lockable fastener including a first member, a second member, and a locking member, the first member having a threaded cavity formed therein, the second member including a threaded shank, the shank having a seat disposed thereon, at least a portion of the shank being threadably receiveable in the cavity, the locking member being engageable with the seat to lockably engage the shank with the first member, and the first member, the second member, and the locking member being axially aligned.

BRIEF DESCRIPTION OF THE DRAWINGS

A further understanding of the invention can be gained from the following Description of the Preferred Embodiments when read in conjunction with the accompanying drawings in which.

Similar numerals refer to similar parts throughout the specification.

DESCRIPTION OF THE PREFERRED EMBODIMENT

Figure 1:
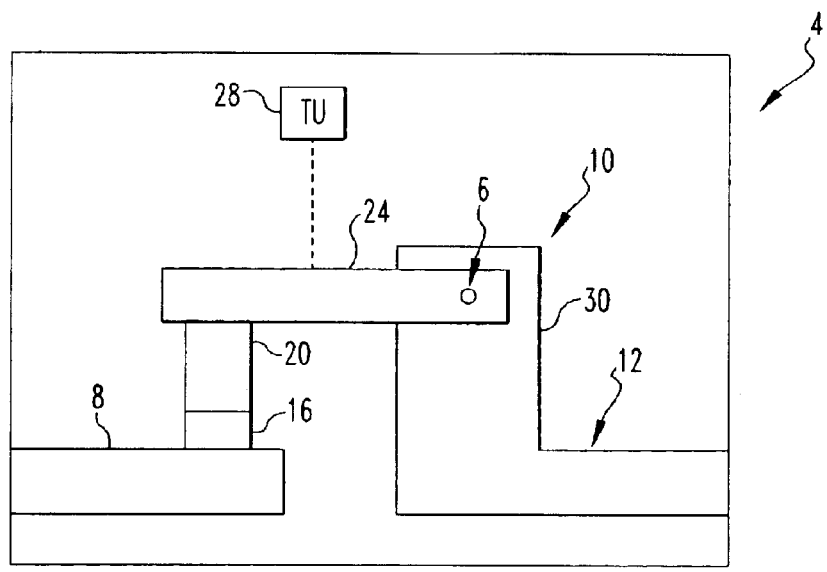
FIG. 1 is a schematic view of an improved circuit breaker in accordance with the present invention employing a schematically depicted improved lockable fastener in accordance with a first embodiment of the present invention.

An improved circuit breaker 4 in accordance with the present invention is depicted schematically in FIG. 1. The circuit breaker 4 advantageously includes a lockable fastener 6 in accordance with a first embodiment of the present invention. As will be described in greater detail below, the lockable fastener 6 is fastenable to a given level of torque, and is advantageously lockable at the given level of torque to resist loosening as a result of movement of the circuit breaker 4 between an ON position and an OFF or TRIPPED position.

While the exemplary circuit breaker 4 is depicted schematically in FIG. 1 as having a single pole 10, it is understood that the circuit breaker 4 likely will be a multi-pole breaker. Each pole 10 of the circuit breaker 4 includes a line conductor 8, a load conductor 12, a pair of fixed contacts 16 (only one of which is depicted), a pair of movable contacts 20 (only one of which is depicted), a pair of arms 24, and one of the lockable fasteners 6. A trip unit 28 is in operative connection, directly or indirectly, with the arms 24 of each pole 10 of the circuit breaker 4 to trip the circuit breaker 4 in a known fashion in response to any of a number of predefined circumstances. While the exemplary circuit breaker 4 is configured such that each pole 10 includes a pair of arms 24, and thus also includes pairs of movable and fixed contacts 20 and 16, it will be appreciated that the fastener 6 can be employed in circuit breakers in which each pole includes only a single movable arm.

Figure 2:
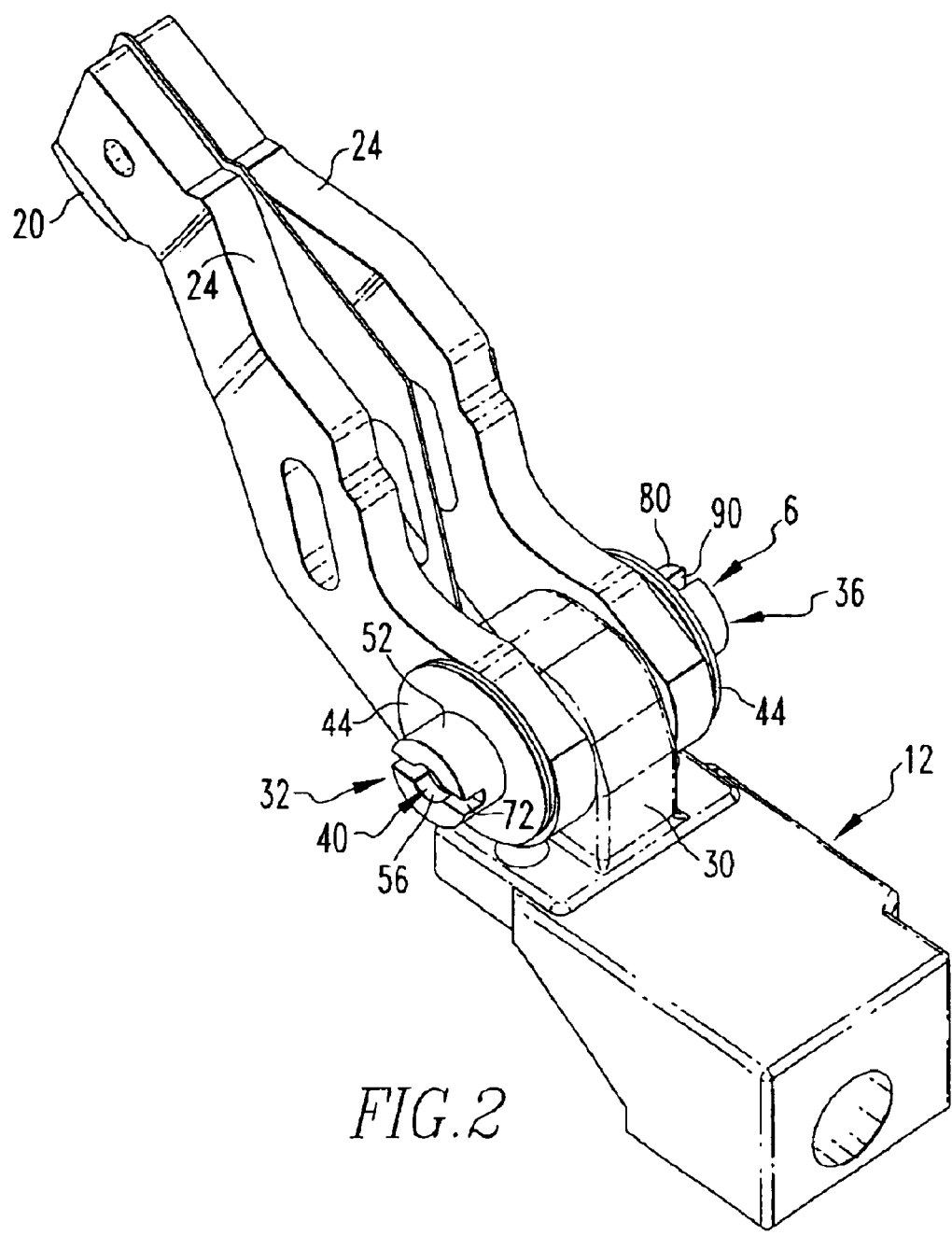
FIG. 2 is an isometric view of a portion of the circuit breaker including the fastener of the first embodiment.

The load conductor includes a post 30 (FIGS. 2 and 3), and the arms 24 are pivotably mounted to the post 30 with the fastener 6. As will be set forth in greater detail below, the fastener 6 fastens the arms 24 to the post 30 with sufficient force to provide electrically conductive connection between the post 30 and the arms 24 while permitting pivoting movement of the arms 24 with respect to the post 30.

Each arm 24 includes a hole 26 (FIG. 3) formed therein near one end. Each arm also includes a movable contact 20 electrically conductively disposed thereon opposite the hole 26.

Figure 4:
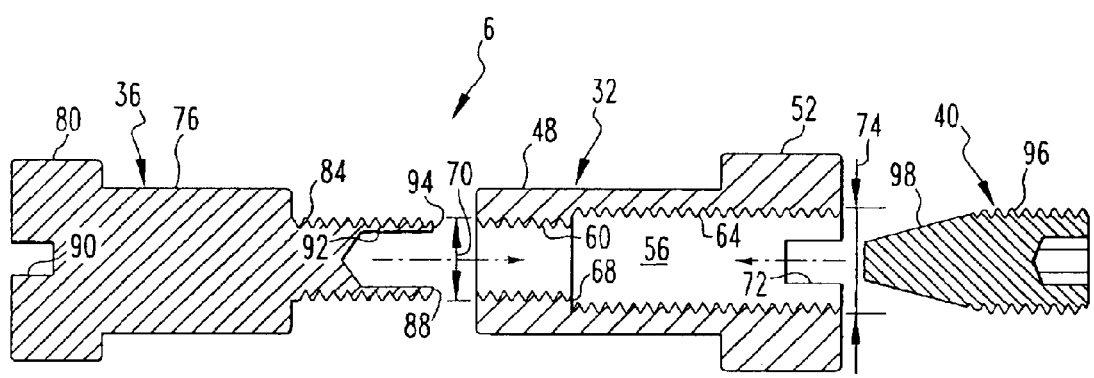
FIG. 4 is an exploded view, partially cut away, of the fastener of the first embodiment.
Figure 3:
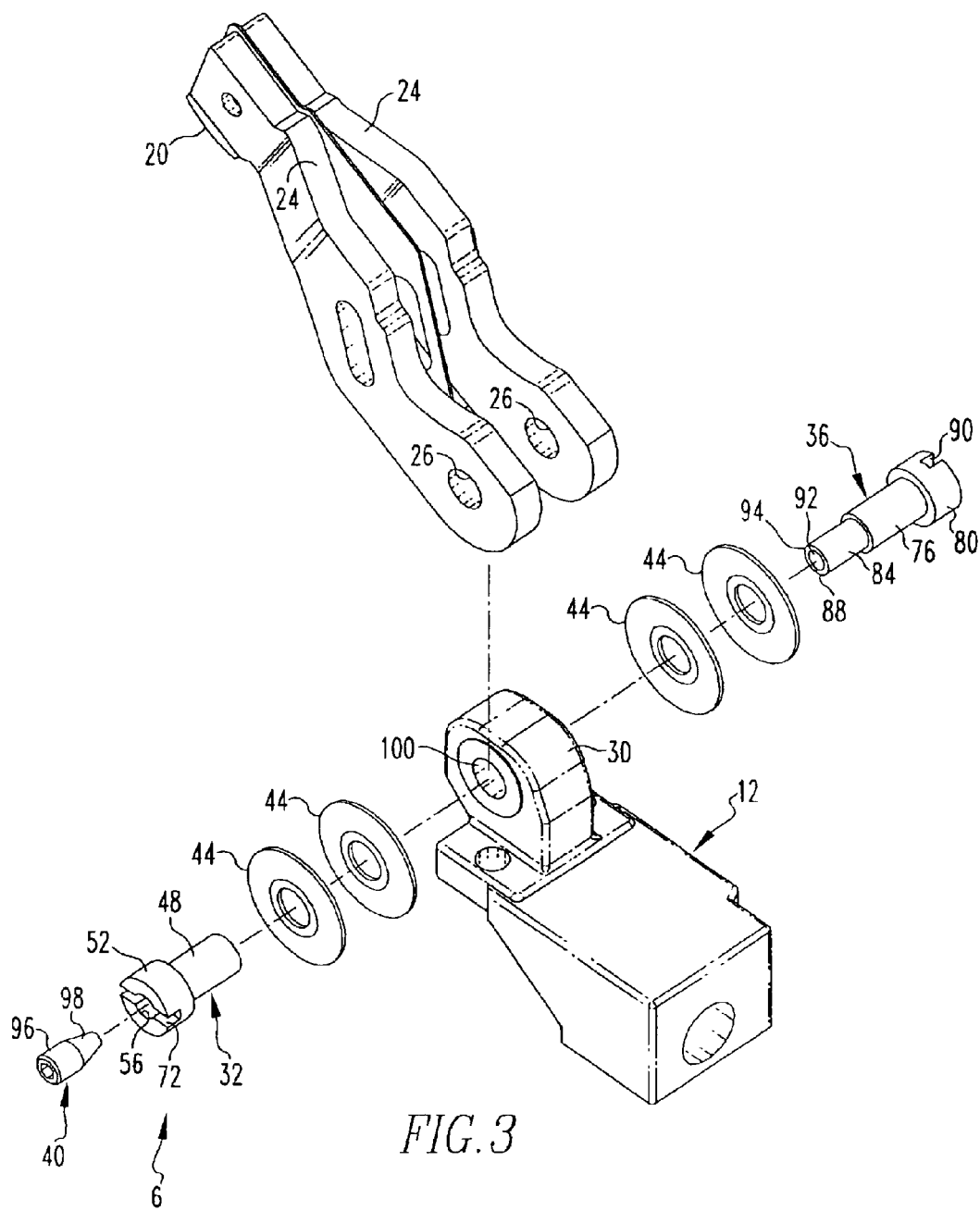
FIG. 3 is a view similar to FIG. 2, except depicting the fastener of the first embodiment and the other components of the circuit breaker in an exploded fashion.
Figure 5:
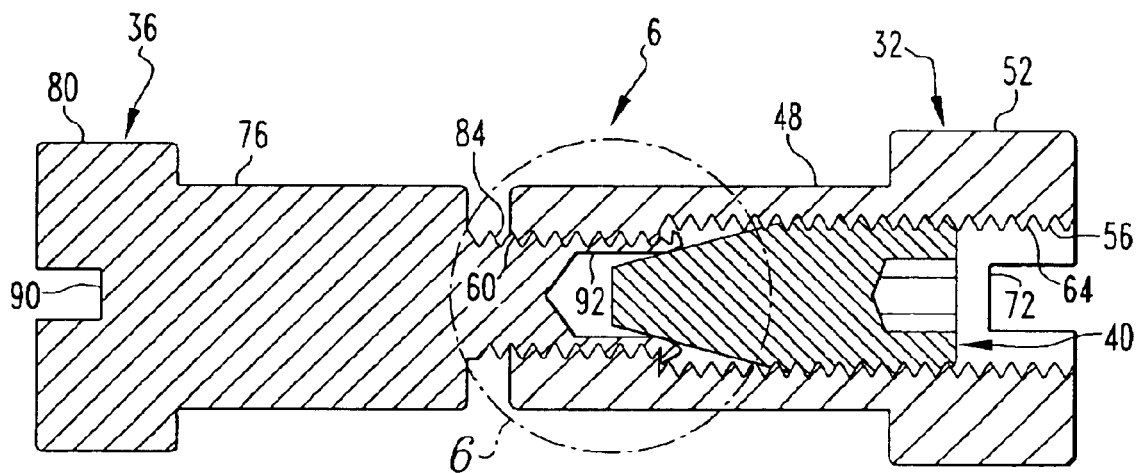
FIG. 5 is an assembled view, partially cut away, of the fastener of the first embodiment.

As is depicted in FIGS. 3–5, the lockable fastener 6 can generally be stated as including a first member 32, a second member 36, and a locking member 40. The depicted exemplary fastener 6 also includes a number of spring washers 44.

The first member 32 includes a first head 52 and an elongated first axle portion 48. The first member 32 includes a cavity 56 formed therein which, in the depicted exemplary first embodiment, extends throughout the longitudinal entirety of the first member 32.

The cavity 56 includes a first threaded portion 60 and a second threaded portion 64 that are separated from one another with a ledge 68. As will be set forth below in conjunction with a second embodiment of the fastener, the first and second threaded portions can be defined in different fashions. The first head 52 includes a first transverse slot 72 formed therein, it being understood that the first head 52 could be of other configurations and could have, for instance, a different tool-appropriate socket instead of the slot 72.

The first threaded portion 60 is of a first diameter indicated at the numeral 70, and the second threaded portion 64 is of a second diameter indicated at the numeral 74. In the exemplary embodiment depicted herein, the first diameter 70 is smaller than second diameter 74. The ledge 68 extends annularly between the first and second threaded portions 60 and 64 and lies in a plane oriented generally perpendicular to the longitudinal extent of the first axle portion 48. The ledge 68 can therefore be seen to have an inner diameter equal to the first diameter 70 and an outer diameter equal to the second diameter 74. It is understood that in alternate embodiments of the present invention the first and second diameters could bear a different relationship to one another without departing from the concept of the present invention, such as if the first diameter were greater than the second diameter and the ledge were defined on an open region extending therebetween, or otherwise.

The second member 36 includes a second head 80, an elongated second axle portion 76, and an elongated shank 84. The shank 84 includes a free end 88 opposite the second axle portion 76 and is externally threaded to threadably cooperate with the first threaded portion 60 of the first member 32.

The second member 36 includes a receptacle 92 formed therein which, in the depicted exemplary embodiment is a cylindrical cavity extending through a portion of the shank 84 from the free end 88 thereof A seat 94 is defined on the receptacle 92 adjacent the free end 88. Depending upon the particular configuration of the lockable fastener 6, the receptacle 92 can extend greater or lesser distances into the shank 84 from the free end 88, and also can extend into the second axle portion 76 as needed. The second head 80 includes a second transverse slot 90 formed therein, it being noted that the second head 80 can also be of a different configuration, as suggested above with respect to the first head 52.

Figure 6:
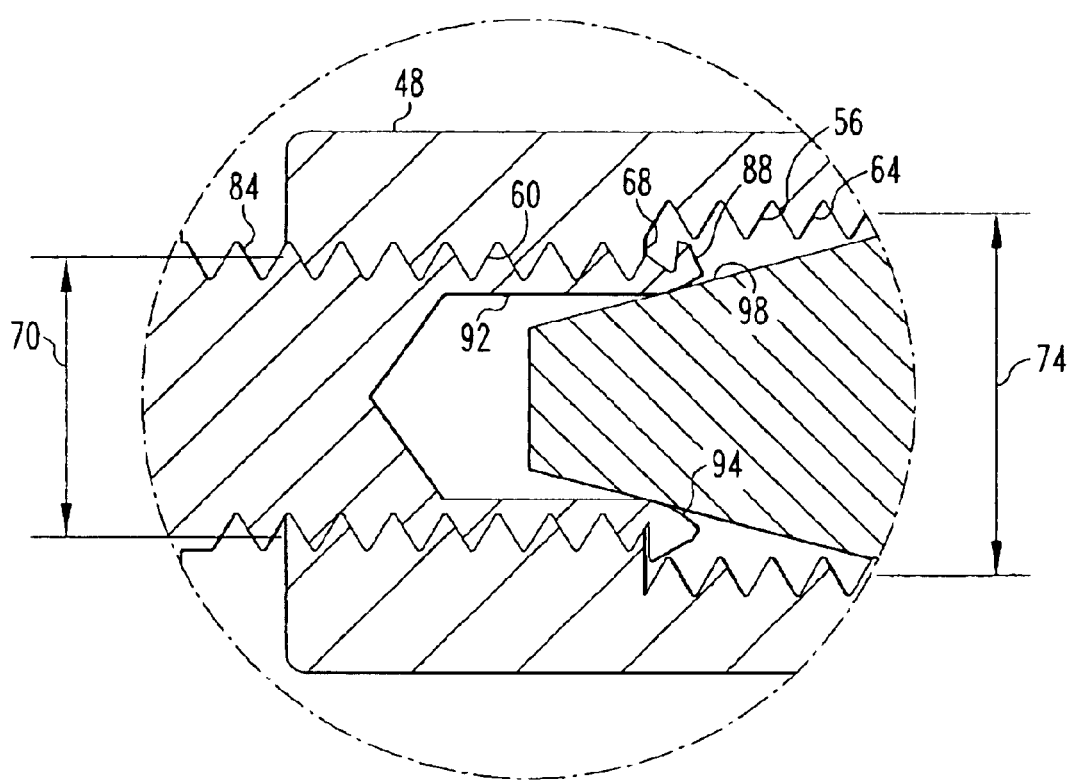
FIG. 6 is an enlarged view of a potion of FIG. 5.

The locking member 40 includes a threaded body 96 and a taper 98. The body 96 is threadably cooperable with the second threaded portion 64 of the first member 32, and the taper 98 is engageable with the seat 94 of the second member 36, as is indicated in FIGS. 5 and 6. A portion of the locking member 40 may be receivable in the receptacle 92 in order to achieve such engagement.

The exemplary taper 98 is generally in the configuration of a right circular cone and thus has a conic surface oriented at an angle with respect to a longitudinal axis of the locking member 40. In the exemplary locking member 40 depicted herein, the angle is about 15°, meaning that the surface-to-surface angle of the taper 98 is about 30°. Other angles can be employed for the taper 98, as will be set forth in greater detail below.

In use, the spring washers 44 are disposed on the first and second axle portions 48 and 76 adjacent the first and second heads 52 and 80. The first axle portion 48 is received through one of the holes 26 of one of the arms 24, and the second axle portion 76 is received through the other hole 26 of the other arm 24. The first and second axle portions 48 and 76 are then received in a bore 100 (FIG. 3) of the post 30 to fasten the arms 24 to the load conductor 12.

The shank 84 is received in a first end of the first member 32 and is threadably engaged with the first threaded portion 60. The first and second members 32 and 36 are then threadably tightened with respect to one another until a certain level of torque is reached. Such a torque likely will have been selected as providing an optimum or appropriate compromise between the desire to electrically conductively fasten the arms 24 to the post 30 of the load conductor 12 while limiting the rotational friction therebetween. At such torque, the first and second axle portions 48 and 76 will be spaced slightly apart, as is indicated in FIG. 5, so that a compressive loading can be achieved therebetween without interference between the ends of first and second axle portions 48 and 76.

In tightening the first and second member 32 and 36 to the aforementioned desired level of torque, the first and second heads 52 and 80 compress the spring washers 44, whereby a given compressive force is maintained between the first and second heads 52 and 80. It is known that such spring washers 44 deflect only a relatively small amount in being compressively loaded. Since the various components of the circuit breaker 4 tend to heat up during operation of the circuit breaker 4, and since such heating results in a certain amount of thermal expansion of the aforementioned components, the spring washers 44 help to maintain the level compressive loading between the first and second heads 52 and 80 despite temperature fluctuations.

Once the first and second members 32 and 36 are tightened to the desired level of torque, the locking member 40 is received in a second, opposite end of the first member 32 into threaded cooperation with the second threaded portion 64. The locking member 40 is threadably advanced with an appropriate tool through the second threaded portion 64 until the taper 98 engages the seat 94 of the receptacle 92. In this regard, at least a portion of the taper 98 likely will be received in the receptacle 92.

The locking member 40 is then tightened in the second threaded portion 64 until an appropriate level of torque is reached between the second threaded portion 64 and the seat 94. In this regard, the body 96 may be formed with an appropriate tool-receiving formation such as a socket opposite the taper 98. In performing the tightening operation the appropriate tool (not shown) would be receivable through the second head 80 into the second threaded portion 64 of the cavity 56 to operably engage the locking member 40.

As can be best understood from FIG. 6, the engagement of the taper 98 with the seat 94 causes a portion of the shank 84 to be deformed about the ledge 68. Such deformation of the shank 84 advantageously assists in resisting the second member 36 from becoming unthreaded, i.e., loosened, from the first member 32, which helps to retain the lockable fastener 6 at the initially tightened level of torque despite repeated operation of the arms 24 of the circuit breaker 4. The deformation of the free end 88 of the shank 84 can be elastic, and additionally can be plastic depending upon the specific needs of the particular application.

From FIGS. 5 and 6 it can be understood that the engagement of the taper 98 with the seat 94 results in a force having both radial and longitudinal components to exist between the taper 98 and the seat 94. The radial component of such force is operable both to radially engage the shank 84 with the first threaded portion 60 and to deform the free end 88 of the shank 84 in the fashion indicated in FIG. 6. The longitudinal component of such force longitudinally engages the threads of the shank 84 with the threads of the first threaded portion 60. The exemplary locking member 40 may, for example, be torqued to a level of torque on the order of about 30 inch-pounds.

Depending upon the thickness of the walls of the shank 84, i.e., the distance between the threaded outer surface of the shank 84 and the surface defined by the receptacle 92, the taper 98 may be configured at different angles to achieve a desirable combination of radial and longitudinal forces on the seat 94. Alternatively, or in addition thereto, the torque to which the locking member 40 is tightened can be varied. For instance, if an alternate embodiment of the lockable fastener 6 employs a shank 84 having a wall thickness greater than that depicted generally in FIGS. 4–6, the taper 98 may be at a sharper, i.e., smaller angle and/or the locking member 40 may be tightened to a relatively higher level of torque in order to achieve a desirable combination of forces between the locking member 40, the first member 32, and the second member 36, and to achieve the deformation depicted generally in FIG. 6.

The lockable fastener 6 in accordance with the present invention, and the resulting circuit breaker 4 in accordance with the present invention, are configured to provide relatively extended periods of reliability since the lockable fastener 6 can be locked at a given torque setting that is substantially unaffected by operation of the circuit breaker 4. The engagement of the locking member 40 between the first and second members 32 and 36 results in radial and longitudinal locking forces to exist between the parts of the fastener 6, and also deforms the second member 36 with respect to the first member 32. These results advantageously resist loosening of the first and second members 32 and 36 with respect to one another. The locking member 40 also advantageously performs the locking function without requiring that relatively longer first and second members 32 and 36 be provided.

The torque setting of the locking member 40 can be readily ascertained on an assembly line, which facilitates assembly of the locking fastener 6 and the resulting circuit breaker 4. Moreover, the locking member 40 is disposed within the interior of the first member 32, so that the fastener 6 occupies a minimal area within the circuit breaker 4. Furthermore, the locking member 40 advantageously locks the first and second members 32 and 36 in a given torque relationship without interfering with such torque.

Figure 7:
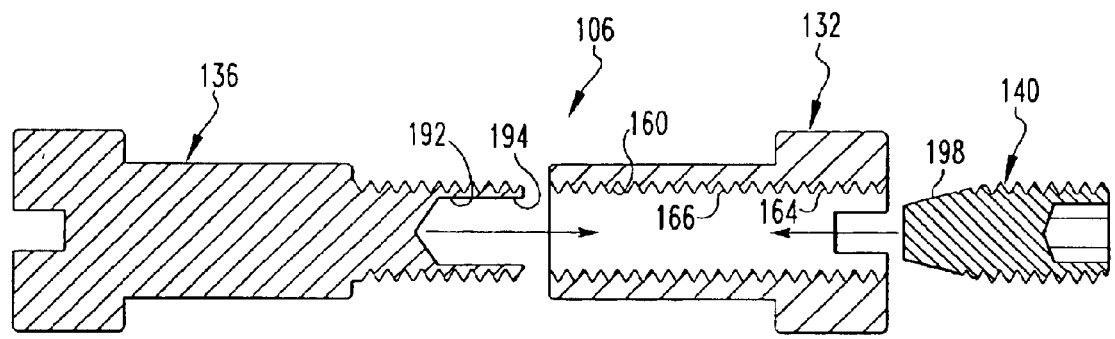
FIG. 7 is an exploded view, partially cut away, of an improved lockable fastener in accordance with a second embodiment of the present invention.
Figure 8:
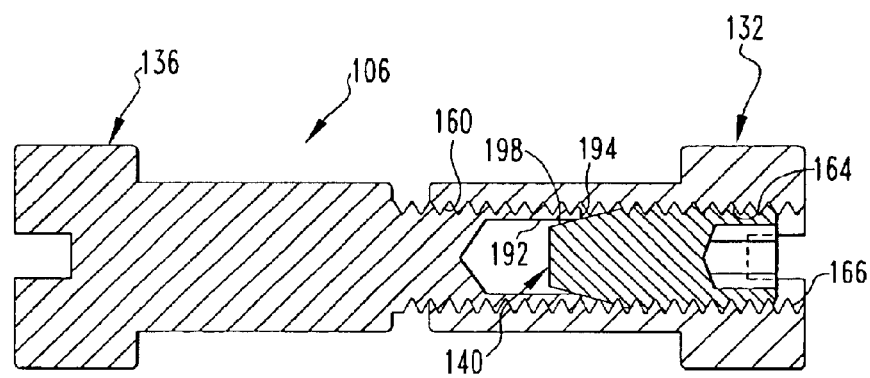
FIG. 8 is an assembled view, partially cut away, of the fastener of the second embodiment.

A second embodiment of a fastener 106 in accordance with the present invention is depicted generally in FIGS. 7 and 8. The fastener 106 can be substituted for the fastener 6 in the circuit breaker 4.

The fastener 106 includes a first member 132, a second member 136, and a locking member 140. However, the first threaded portion 160 and the second threaded portion 164 are defined as being different regions of a single threaded passage 166. As such, the first and second threaded portions are of the same diameter, and no ledge is disposed therebetween. Engagement of a taper 198 of the locking member 140 with a seat 194 of a receptacle 192 of the second member 136 thus performs a locking function without deformation of a portion of the second member 136 about a ledge. However, engagement of the taper 198 with the seat 194 results in both longitudinal and radial forces among the first member 132, the second member 136, and the locking member 140. As such, the portion of the second member 136 in the vicinity of the seat 194 is radially engaged with the first threaded portion 160 of the first member 132. Also, the threads of the second member 136 are longitudinally engaged with the threads of the first threaded portion 160.

The fastener 106 thus is lockable by application of the locking member 140 after the first and second member 132 and 136 have been tightened to a specific level of torque. While the locking member does not deform a portion of the second member 136 about a ledge of the first member 132 in the same manner as the fastener 6, it is understood that at least a small degree of deformation of the components of the fastener 106 occurs during locking thereof. The locking member 140 still imparts both radial and longitudinal forces to the second member 136.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A lockable fastener for connecting together a plurality of components of a circuit breaker and for maintaining electrical conductivity between the components while permitting relative movement therebetween, the fastener comprising:

a first member having a threaded cavity formed therein;

a second member including a threaded shank, the shank having a seat disposed thereon, at least a portion of the shank being threadably receiveable in the cavity;

a locking member, the locking member being engageable with the seat to lockably engage the shank with the first member; and the first member, the second member, and the locking member being axially aligned.

2. The fastener as set forth in claim 1, in which the locking member is threaded;

the locking member being threadably cooperable with the first member.

3. The fastener as set forth in claim 2, in which the threaded cavity includes a first threaded portion and a second threaded portion;

the shank being threadably receiveable in the first threaded portion; and the locking member being threadably receiveable in the second threaded portion.

4. The fastener as set forth in claim 3, in which the threaded cavity includes a ledge interposed between the first and second threaded portions.

5. The fastener as set forth in claim 4, in which the shank extends at least partially into the second threaded portion;

at least a portion of the second member being deformeable by the locking member into engagement with the ledge.

6. The fastener as set forth in claim 5, in which the first threaded portion is of a first diameter;

the second threaded portion being of a second diameter;

the first diameter being smaller than the second diameter.

7. The fastener as set forth in claim 1, in which the seat includes a receptacle;

the locking member including a taper;

at least a portion of the taper being receiveable in the receptacle when the locking member is engaged with the seat.

8. The fastener as set forth in claim 7, in which the cavity extends throughout the longitudinal entirety of the first member;

the second member being receivable through a first end of the first member;

the locking member being receivable through a second, opposite end of the first member.

9. The fastener as set forth in claim 8, in which the first member includes at least a first spring washer.

10. A circuit breaker comprising:

a line conductor;

a load conductor;

a fixed contact;

a movable contact;

a movable arm, the movable contact being electrically conductively disposed on the arm;

a trip unit operatively connected with the arm; and a lockable fastener;

the fixed contact being electrically conductively disposed on one of the line and load conductors;

the arm being electrically conductively connected with and movably mounted to the other of the line and load conductors with the lockable fastener;

the lockable fastener including a first member, a second member, and a locking member;

the first member having a threaded cavity formed therein;

the second member including a threaded shank, the shank having a seat disposed thereon, at least a portion of the shank being threadably receiveable in the cavity;

the locking member being engageable with the seat to lockably engage the shank with the first member; and the first member, the second member, and the locking member being axially aligned.

11. The circuit breaker as set forth in claim 10, in which the locking member is threaded;

the locking member being threadably cooperable with the first member.

12. The circuit breaker as set forth in claim 11, in which the threaded cavity includes a first threaded portion and a second threaded portion;

the shank being threadably receiveable in the first threaded portion; and the locking member being threadably receiveable in the second threaded portion.

13. The circuit breaker as set forth in claim 12, in which the threaded cavity includes a ledge interposed between the first and second threaded portions.

14. The circuit breaker as set forth in claim 13, in which the shank extends at least partially into the second threaded portion;

at least a portion of the second member being deformeable by the locking member into engagement with the ledge.

15. The circuit breaker as set forth in claim 14, in which the first threaded portion is of a first diameter;

the second threaded portion being of a second diameter;

the first diameter being smaller than the second diameter.

16. The circuit breaker as set forth in claim 12, in which the first and second threaded portions are in communication with the exterior of the first member.

17. The circuit breaker as set forth in claim 10, in which the shank is longitudinally and radially lockably engageable with the threaded cavity.

18. The circuit breaker as set forth in claim 10, in which the seat includes a receptacle;

the locking member including a taper;

at least a portion of the taper being receiveable in the receptacle when the locking member is engaged with the seat.

19. The circuit breaker as set forth in claim 18, in which the cavity extends throughout the longitudinal entirety of the first member;

the second member being receivable through a first end of the first member;

the locking member being receivable through a second, opposite end of the first member.

20. The circuit breaker as set forth in claim 19, in which the first member includes at least a first spring washer.

* * * * *